Dec. 26, 1961 B. C. T. ELWORTHY Re. 25,104

SAFETY SYSTEM FOR SAWMILL CARRIAGES

Original Filed Feb. 10, 1958 4 Sheets-Sheet 1

INVENTOR.
Bernard C.T. Elworthy
BY Oliver D. Olson
Agent

SAFETY SYSTEM FOR SAWMILL CARRIAGES

Original Filed Feb. 10, 1958 4 Sheets-Sheet 2

INVENTOR.
Bernard C.T. Elworthy
BY Olivier D. Olson
Agent

SAFETY SYSTEM FOR SAWMILL CARRIAGES

Original Filed Feb. 10, 1958 4 Sheets-Sheet 3

INVENTOR.
Bernard C.T. Elworthy
BY
Olivier D. Olson
Agent

SAFETY SYSTEM FOR SAWMILL CARRIAGES

Original Filed Feb. 10, 1958 4 Sheets-Sheet 4

INVENTOR.
Bernard C. T. Elworthy.
BY
Olivier D. Olson
Agent

United States Patent Office

Re. 25,104
Reissued Dec. 26, 1961

25,104

SAFETY SYSTEM FOR SAWMILL CARRIAGES

Bernard C. T. Elworthy, Vancouver, British Columbia, Canada, assignor to Elmer R. Worth, Sr., Salem, Oreg.

Original No. 2,893,448, dated July 7, 1959, Ser. No. 714,325, Feb. 10, 1958. Application for reissue Mar. 31, 1960, Ser. No. 19,137
14 Claims. (Cl. 143—120)

Matter enclosed in heavy brackets [ ] appears in the original patent but forms no part of this reissue specification; matter printed in italics indicates the additions made by reissue.

This invention pertains to the operation of sawmill carriages, and relates particularly to a safety system by which the operating components of a sawmill carriage are prevented from entering the saw line.

The construction and operation of a sawmill carriage and saw assembly briefly is as follows:

The carriage is a wheeled framework supported upon spaced rails which guide the carriage back and forth past a power driven saw. The carriage includes a plurality of spaced head blocks upon each of which a knee is mounted for lateral reciprocation, i.e. toward and away from the saw line of a saw which is mounted adjacent the carriage. The knees may be reciprocated by various means such as hydraulically actuated rams or, more conventionally, by rack and pinion or sprocket and chain connection to a rotary set shaft which is driven by an electric motor or other electrically actuated motor such as an air or hydraulic type motor. Control of the movement of the knees in desired increments toward the saw line is provided by jog switch or, more accurately, by setworks. Logs are deposited one at a time from a log deck upon the head blocks of the carriage in abutment with the faces of the knees. The log is retained in this position by such means as tong dogs and hook dogs, well known in the art. The hook dog generally is employed to secure larger logs and cants against the knee and the tong dogs generally are employed to secure smaller logs and cants.

In addition, provision generally is made for moving each knee within restricted limits independently of the setting motion provided by the hydraulic rams or set shaft drive. This provision is made to compensate for the normal taper of a log in order to align the longitudinal axis of a log parallel to the saw line preliminary to removing the surface slabs.

In the normal operation of a sawmill carriage it frequently occurs, through inadvertence or faulty operation of the apparatus, that the knee itself or the dogs supported thereby are moved forwardly into the saw line where they may be engaged by the saw. This situation not only presents an extremely hazardous condition to the operators, but also results in serious damage to the saw and to the operating components of the carriage, necessitating costly repairs and loss of operating time.

Accordingly, it is a principal object of the present invention to provide a safety system by which to prevent the knees and dogs supported thereby from entering the saw line.

Another important object of this invention is the provision of a safety system by which the limit of forward movement of the knees of the sawmill carriage is determined automatically by the condition of taper of the knees, or by the position of extension or retraction of the dogs associated with the knees.

A further important object of the present invention is to provide a safety system of the class described, which is of simplified construction for economical manufacture, which is adaptable for use with all types of sawmill carriages, and which is capable of long and faithful service with a minimum of maintenance and repair.

The foregoing and other objects and advantages of this invention will appear from the following detailed description, taken in connection with the accompanying drawings, in which:

FIG. 1 is a fore-shortened end view, partly in section, of a sawmill carriage illustrating an operational arrangement for a knee and associated dogs, and adaptable for control by the safety system of the present invention;

FIGS. 2 to 7 inclusive are schematic plan views of a sawmill carriage assembly and illustrating various conditions of operation and corresponding requirements for control by the safety system of this invention;

Figures 1, 2, 3, 4, 5, 6, 7:
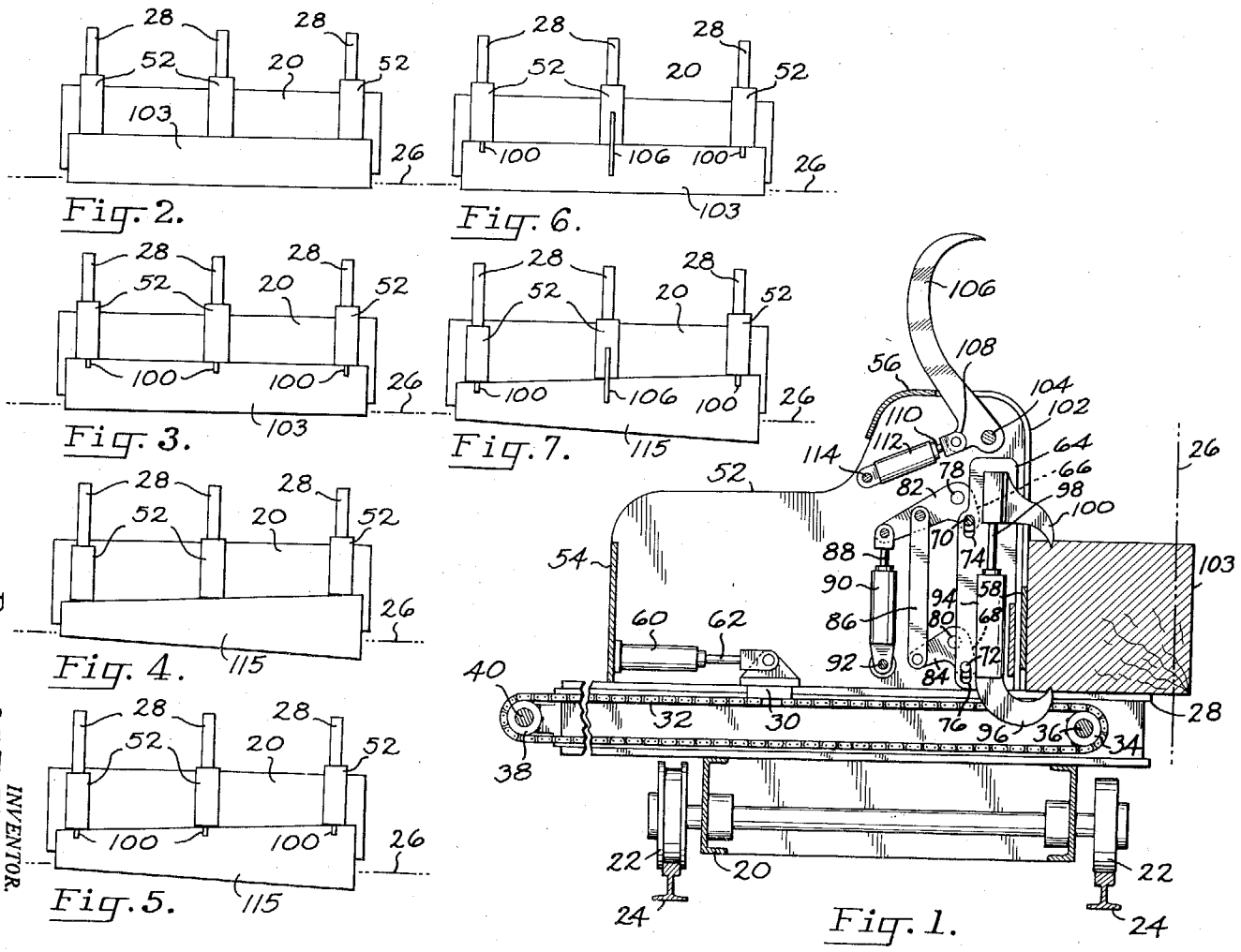

Referring to FIG. 1 of the drawings, the sawmill carriage assembly illustrated therein includes a carriage frame 20 provided with a plurality of rollers 22 supported upon spaced tracks 24 which accommodate movement of the carriage in a direction parallel to a saw line 26. Mounted upon the carriage frame are a plurality of elongated head blocks 28 arranged transversely of the carriage and substantially normal to the saw line. Mounted slidably upon each head block is a knee base 30. This base is connected by any conventional means to a source of power for reciprocating it on the head block, forwardly and rearwardly with respect to the saw line. In the embodiment illustrated in FIG. 1, the knee base is connected to an endless chain 32 which is reeved over spaced sprockets. The forward sprocket 34 is mounted for rotation on a shaft 36 journaled adjacent the forward end of the head block, and the rearward sprocket 38 is secured for rotation with a set shaft 40 journaled for rotation adjacent the rearward end of the head block. The set shaft is coupled in any conventional manner to a source of power. In the embodiments illustrated in FIGURES 13 and 14, the set shaft 40 is coupled through sprockets 42, 44 and chain 46 to the drive shaft 48 of the reversible electric motor 50.

A knee structure is associated with the knee base in any conventional manner. In the embodiment illustrated in FIGURE 1, the knee structure is a hollow member formed by spaced side walls 52 interconnected by a rear brace 54, a top brace 56, and a front plate 58. The knee is supported slidably upon the head block and the rear brace thereof is connected to the knee base by such means as the adjustable assembly of the taper air cylinder 60 and piston 62. It is by means of this adjustable interconnection that the knee may be moved relative to the knee base to accommodate the taper mentioned hereinbefore.

Within the hollow structure of the knee is a tong dog support 64, arranged for forward and rearward reciprocation with respect to the front plate of the knee. In the embodiment illustrated the dog support is mounted upon one arm 66, 68 of each of a pair of bell crank members by means of pins 70, 72 which project from said bell crank members through elongated slots 74, 76, respectively, in the dog support. The bell crank members are mounted pivotally intermediate their ends on a side wall of the knee structure, as by means of the pins 78, 80. The opposite arms 82, 84 of the bell crank members are interconnected pivotally by the link 86. The terminal end of the bell crank arm 82 is connected pivotally to the piston rod 88 associated with the tong dog support air cylinder 90 which is mounted pivotally at its opposite end on the side wall of the knee structure, as by means of the pivot pin 92.

Thus, by actuation of the tong dog support cylinder to extend its piston rod, the bell crank members are pivoted in a clockwise direction, whereupon the tong dog support is moved rearwardly with respect to the front wall of the knee structure. Conversely, when the tong dog support air cylinder is actuated to retract its piston rod, the bell crank members are pivoted in a counterclockwise direction to move the tong dog support forwardly toward the front wall of the knee stucture.

Mounted slidably for vertical reciprocation on the tong dog support is a tong dog air cylinder 94. A lower tong dog 96 is secured to the lower end of this cylinder and projects forward and upward through a longitudinal slot in the head block for limited vertical reciprocation. A piston rod 98 projects from the opposite end of the air cylinder and supports an upper tong dog 100 which projects arcuately forward and downward, in opposition to the lower tong dog. A slot 102 is formed between the top brace and the front plate of the knee to accommodate extension of the upper tong dog therethrough.

Thus, by actuation of the tong dog cylinder in the direction to draw the opposed tong dogs together, the upper tong dog is moved downwardly into engagement with the upper surface of a cant 103 supported on the head blocks. As this dog tends to move further downward, the tong dog air cylinder is moved vertically, elevating the lower tong dog into engagement with the lower surface of the cant.

Also mounted on a side wall of the knee support on pivot pin 104 is a hook dog 106 which extends upwardly through the slot 102 in the knee. An extension 108 on the hook dog is pivotally connected to the piston rod 110 of the hook dog air cylinder 112, the opposite end of the latter being secured pivotally to the side wall of the knee by means of the pivot pin 114.

Thus, by actuation of the hook dog cylinder to extend its piston rod, the hook dog is pivoted in the clockwise direction to project the hook forwardly and downwardly to engage a log positioned on the head blocks.

From the foregoing it will be apparent that there are several conditions of operation of the knees and dogs in the normal operation of a sawmill carriage assembly, each of which presents a different safety situation in connection with the saw line. These conditions are illustrated schematically in FIGURES 2 to 7, inclusive, wherein the carriage 20 is shown to include three head blocks 28 and knees 52, each having a tong dog assembly and the center knee only having a hook dog assembly. In FIGURE 2 the illustration exemplifies the situation wherein the knees are not tapered and none of the dogs are extended, such as might be the case when a log or cant 103 is being rejected from the carriage or when the final board is being removed from the carriage. FIGURE 3 illustrates the condition in which a cant is being held against the knees by the tong dogs only, and the knees are not tapered. FIGURE 4 illustrates the condition in which a tapered log 115 is resting freely against tapered knees and is to be rejected from the carriage. FIGURE 5 illustrates the condition in which a tapered log is secured against tapered knees by means of the tong dogs, preliminary to removing the surface slabs. FIGURE 6 illustrates the condition in which a log or cant is held against untapered knees by means of the hook dog as well as the tong dogs, as is sometimes required with cants of large dimension. FIGURE 7 illustrates the condition in which a tapered log is supported against tapered knees by means of the hook dog and, if practicable, the tong dogs as well.

It will be apparent from the illustrations in FIGURE 2–7 inclusive, that the minimum safe distance between the front face of the knee and the saw line must be varied, depending upon the condition of taper and the position of extension or retraction of the tong and hook dogs, to prevent any of said components from entering the saw line. It is the control of this minimum distance that the safety system of the present invention achieves, by means of an assembly of switches and switch actuators arranged in such manner as to stop the forward movement of the knees when the forwardmost projecting component of the knee assembly reaches a predetermined safe position with respect to the saw line.

Figure 13:
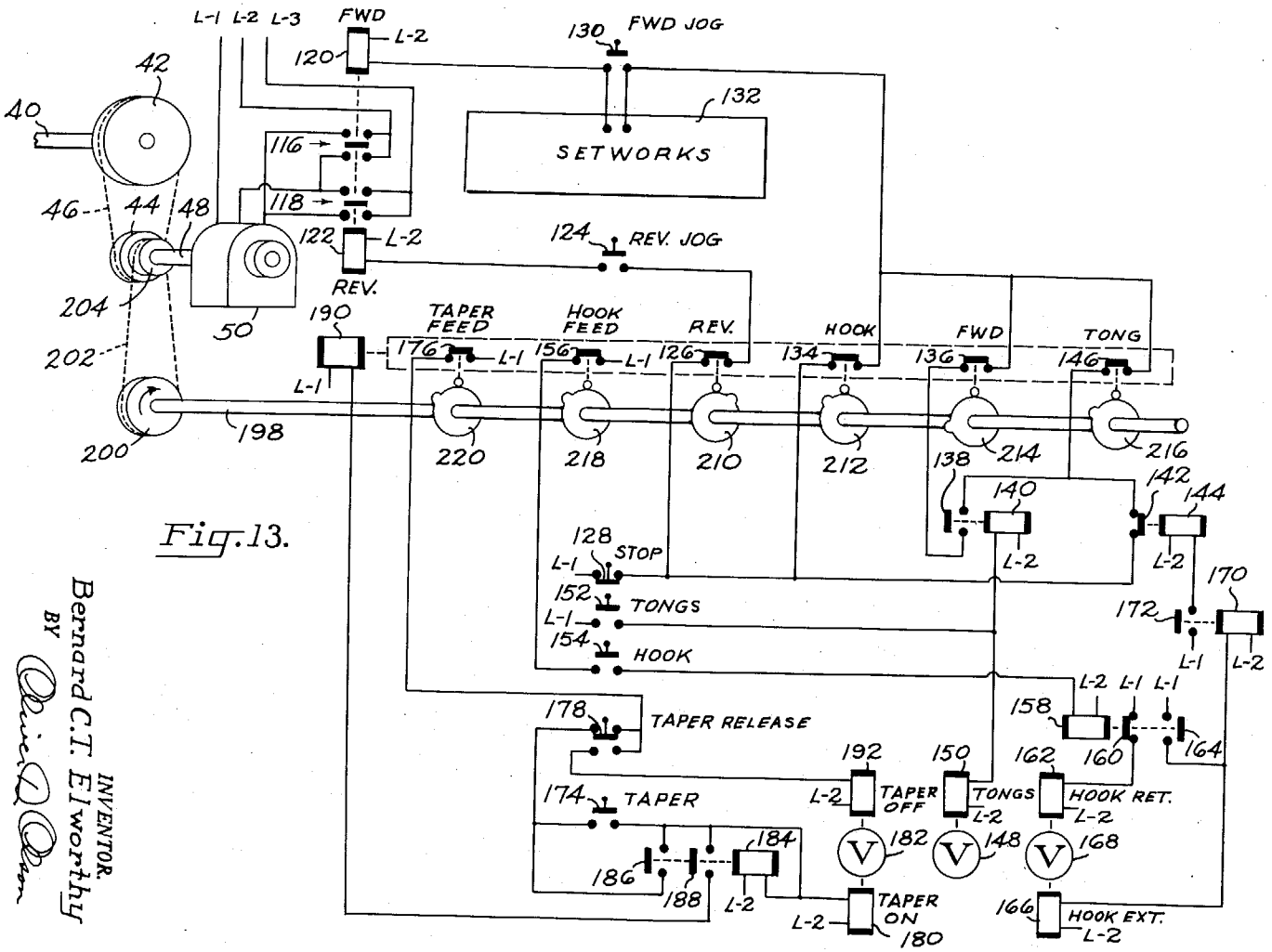
FIG. 13 is a schematic diagram of an electric circuit adaptable for use with the control assembly of FIG. 8 and the carriage assembly of FIG. 1.

Referring now to FIGURE 13 of the drawings, wherein is illustrated schematically one embodiment of the safety system of this invention, the reversible set shaft motor 50 is connected through forward and reverse starter switch assemblies 116 and 118, respectively, to the lines L–1, L–2 and L–3 leading to a source of electrical potential. These forward and reverse switches are controlled selectively by means of forward and reverse relays 120 and 122 respectively. The reverse relay is included in an electric circuit from line L–2 through the reverse control push button switch 124, through the reverse safety switch 126 and the emergency stop switch 128, to line L–1. The forward relay is included in an electric circuit extending from line L–2 through either the forward jog push button switch 130 or a setworks mechanism 132, and thence selectively either through the hook dog safety switch 134, or through the series arrangement of the forward safety switch 136 and the normally open switch 138 of relay 140 and the normally closed switch 142 of relay 144, or through the series combination of the tong dog safety switch 146 and the normally closed switch 142 of relay 144. From any of these alternate paths the circuit is completed through the emergency stop switch 128 to line L–1. The path through which the forward relay is completed depends upon the position of extension or retraction of the tong dogs and hook dog, as follows:

The valve 148 controlling the air to the tong dog support cylinder 90 is controlled by the solenoid 150 which is arranged in an electric circuit extending from line L–2 to the tong dog push button switch 152 to line L–1. In the normally open position of this push button switch, the air control valve is positioned to supply air to the tong dog support cylinder in such manner as to move the dog support forwardly toward the front plate of the knee, whereby to maintain the tong dogs extended from the front face of the knee, as illustrated in FIGURE 1. When the tong dogs are to be retracted into the knee, the tong dog push button switch 152 is closed to complete the electric circuit of the solenoid 150, thereby simultaneously completing the circuit of relay 140 and closing the normally open switch 138. Thus, the electric circuit of the forward relay 120 is completed through all three of the safety switches 134, 136 and 146. However, as explained more fully hereinafter, the forward safety switch 136 will be opened last of the three by virtue of the arrangement of safety switch actuators, thus permitting the knee to reach a position of minimum distance from the saw line.

When the tong dogs 96, 100 are extended by opening the tong dog push button switch 152, relay 140 is deenergized and the associated switch 138 is opened. Thus the electric circuit of the forward relay 120 is completed only through the hook and tong dog safety switches 134 and 146, respectively, and, as explained hereinafter, since the tong dog safety switch will be opened after the hook dog safety switch, the forward movement of the knee will be arrested at a point farther removed from the saw line, in order to prevent the extended tong dogs from entering the saw line.

The hook dog 106 is extended by closing the hook dog push button switch 154, [then by] *thereby* completing an electric circuit from line L–1 through the hook feed safety switch 156, through the relay 158 to line L–2. Upon energization of this relay, the normally closed switch 160 in the circuit of the hook dog retraction solenoid 162 is opened and the normally open switch 164 in the circuit of the hook dog extension solenoid 166 is closed, thereby actuating the air control valve 168 to the position in which the hook dog air cylinder 112 is actuated to extend the hook dog. Simultaneously, closure of the normally open switch 164 causes energization of relay 170 and closing of its associated normally open switch 172, thus energizing relay 144 and opening the normally closed switch 142 in series with the tong dog safety switch 146. In this manner the electric circuit of the forward relay coil 120 is completed only through the hook dog safety switch 134, thus causing the forward movement of the knee to be arrested at a still farther retracted position, at which the extended hook dog does not enter the saw line.

Tapering of the knee is achieved by depressing the taper push button switch 174 which closes an electric circuit from line L–1 through the taper feed safety switch 176 and taper release push button 178, through the "Taper On" solenoid 180 to line L–2. This solenoid actuates the air control valve 182 to the position in which air is admitted to the taper cylinder 60 in the direction to retract the piston rod 62 and thus move the knee structure forwardly relative to the knee base 30. Simultaneously with the energization of the solenoid 180, the relay 184 is energized, thereby closing the normally open switches 186, 188. Switch 186 provides a holding circuit around the taper push button switch 174, while switch 188 completes a circuit from line L–1 through the taper switching solenoid 190. This solenoid functions to move the group of safety switches relative to their actuating cams, from their normal position when the knees are not tapered to a position at which the safety switches will be actuated earlier than normal, to compensate for the taper of the knees.

Return of the knees to untapered condition is effected by moving the taper release push button switch 178 to energize the "Taper Off" solenoid 192 which actuates the air control valve 182 to extend the piston rod 62 of the taper cylinder 60.

The mechanical assembly of the safety switches and their actuating cams, as illustrated schematically in FIGURE 13, may be provided by various means, a preferred arrangement being illustrated in FIGURES 8–12, inclusive. In the embodiment therein illustrated, a housing 194 is formed of a base and side walls, and is adapted to be closed with a cover (not shown). Supported transversely through the housing, by means of bearings 196, is a shaft 198 which, as indicated in FIGURE 13, is adapted to mount a sprocket 200 for receiving the chain 202 trained over a second sprocket 204 mounted on the drive shaft 48 of the set shaft motor 50.

Mounted at spaced intervals upon the shaft 198 within the housing are a plurality of spaced hubs 206, the hubs being secured to the shaft by such means as the set screws 208. The lateral ends of the hubs are reduced in diameter, and each receives freely thereon a ring shaped cam member, the six illustrated being identified by reference numerals 210, 212, 214, 216, 218 and 220. Each of the ring shaped cam members is releasably secured to the hub by a diametrically disposed clamp plate 222 which is releasably secured to the hub by such means as the bolts 224. The thickness of the cam member is made greater than the depth of the reduced end section of the hub, whereby the clamp plate functions to frictionally grip the cam member in any selected position of adjustment on the hub. In this manner each cam member may be adjusted to any position of rotation with respect to the safety switch it operates.

Figure 8:
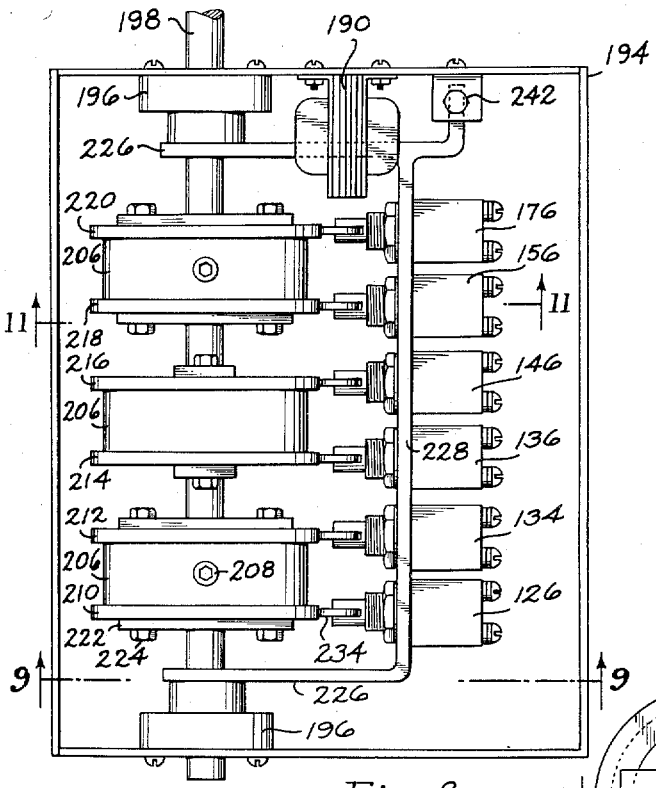
FIG. 8 is a plan view of a control assembly forming a part of a safety system embodying the features of the present invention.
Figure 10:
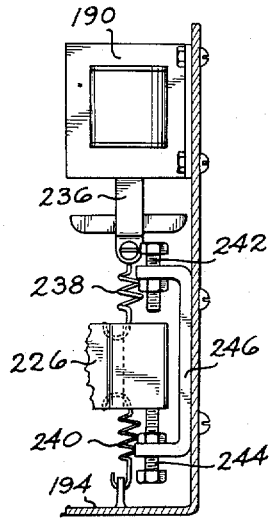
FIG. 10 is a fragmentary sectional view taken along the line 10—10 in FIG. 9.
Figure 11:
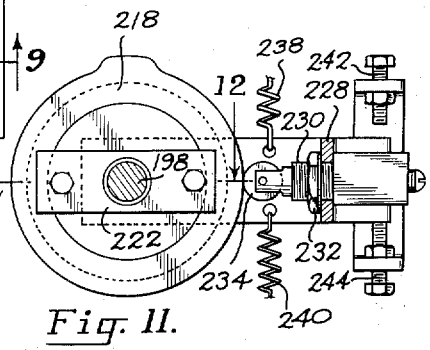
FIG. 11 is a sectional view taken along the line 11—11 in FIG. 8.
Figure 9:
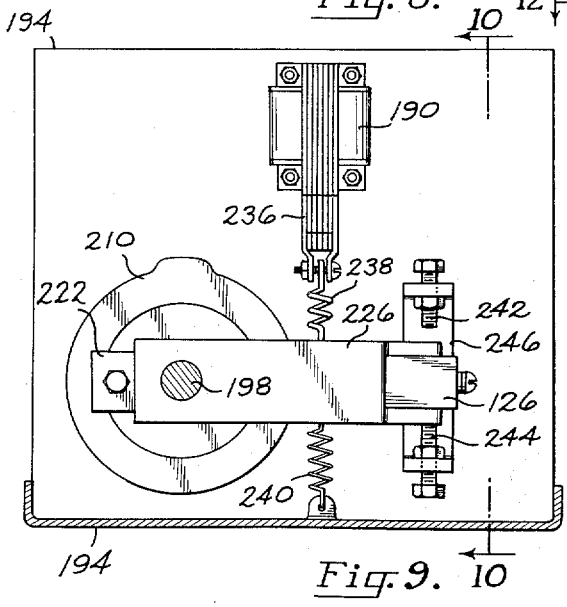
FIG. 9 is a sectional view taken along the line 9—9 of FIG. 8 and illustrating the manner of adjustment of the switch support between conditions of taper and no taper of the knees of a sawmill carriage.
Figure 12:
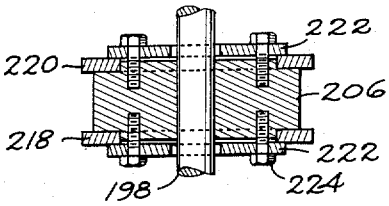
FIG. 12 is a sectional view taken along the line 12—12 in FIG. 11 and showing a structural arrangement for a cam assembly forming a part of the control assembly of FIG. 8.

A U-shaped frame is journaled at its free ends 226 on the shaft 198, and the intermediate section 228 of the frame functions to support the plurality of safety switches 126, 134, 136, 146, 156, 176. In the embodiment illustrated, and as best shown in FIGURES 8 and 11, the intermediate section of the frame is provided with a plurality of openings through which project the threaded sleeves 230 of the safety switches. A securing nut 232 clamps the switches to the frame, with the roller contact members 234 of the switches disposed in line with the cams for actuation thereby.

The taper switching solenoid 190 is mounted upon the housing above the switch supporting frame, with its depending armature 236 connected resiliently to the switch supporting frame 226 by means of the coil spring 238. A second coil spring 240 of lesser strength interconnects the switch support frame and the base of the housing, to prevent bouncing of the frame when the latter is returned to its normal position after elevation by the taper switching solenoid. The limits of movement of the frame are confined adjustably by the abutment screws 242 and 244 which are threaded through the opposite inturned ends of the bracket 246 secured to the housing. By means of these adjustable abutment screws, the switch supporting frame may be adjusted to any normal position and to any elevated position corresponding to the desired taper, thereby shifting the position of the safety switch actuating rollers 234 with respect to the cam lobes on the ring shaped cam members.

From a consideration of FIGURES 2, 3 and 6 of the drawings, it will be apparent that the minimum distance between the front face 58 of the knee and the saw line 26 will be the least when the tong dogs and hook dog are retracted, as per FIGURE 2; will be greater when the tong dogs are extended and the hook dog retracted; as per FIGURE 3; and will be greatest when the hook dog is extended, as per FIGURE 6. Accordingly, the switch actuator cams associated with the safety switches are so adjusted that as the shaft 198 is rotated during forward travel of the knees, the hook dog safety switch 134 is opened first, the tong dog safety switch 146 is opened next, and the forward limit safety switch 136 is opened last. This arrangement is illustrated in FIGURE 13.

The hook feed and taper feed safety switches 156 and 176, respectively, are provided in order to prevent extension of the hook dog or tapering of the knees whenever the knees are disposed so close to the saw line 26 that extension of the hook dog would bring it across the saw line, or tapering of the knees would bring the knees across the saw line. Accordingly, the cams associated with the safety switches for the hook dog feed and taper feed are so adjusted that the electric circuits of the hook dog solenoid 166 and taper solenoid 180 are opened when the knees are too far forward to permit extension of the hook dog or tapering of the knees.

The cam 210 is associated with the reverse safety switch 126 is so arranged as to open the latter when the knees have been retracted to their maximum limit, as will be apparent.

Figure 14:
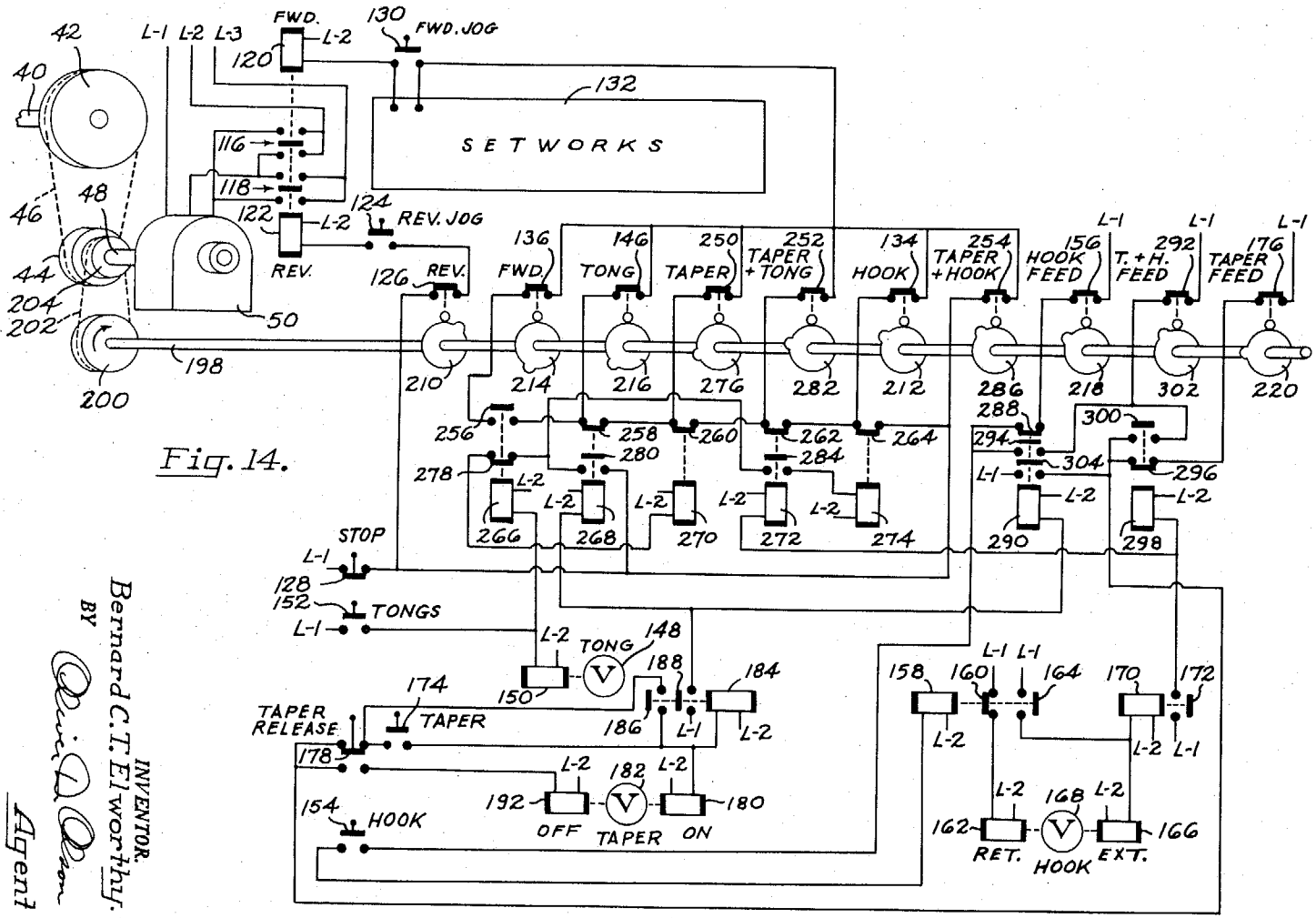
FIG. 14 is a schematic diagram of an electric circuit adaptable for use with a modified form of control assembly.

Referring now to FIGURE 14 of the drawings, the modification illustrated therein eliminates the pivoted support 226, 228 for the safety switches and the associated taper switching solenoid assembly of the embodiment illustrated in FIGURES 8–13 inclusive, and substitutes therefor a plurality of additional safety switches and associated actuating cams. Thus, the physical assembly for the embodiment of FIGURE 14 may be provided by the structure illustrated in FIGURES 8 and 9, by eliminating the solenoid 190 and springs 238, 240 and rendering the switch support frame 226, 228 rigid, as by turning the upper abutment screw 242 downwardly into engagement with the frame. It will be understood, of course, that the switch support frame, housing and shaft 198 will be elongated in order to accommodate the additional switches and cams illustrated in FIGURE 14. The electrical circuitry for the set shaft motor 50 is the same as illustrated in FIGURE 13, as is the actuation of the tong dogs, hook dog, and taper. However, the control of forward movement of the knees is as follows:

Under the operating condition illustrated in FIGURE 2, wherein the knees are not tapered and the dogs are not extended, forward movement of the knees is effected by closing of the forward jog switch 130, or by the setworks mechanism 132, thereby completing the electric circuit of the forward relay 120 from line L–2, through all of the parallel circuits of the safety switches 134, 136, 146, 250, 252, 254 and the associated switches 256, 258, 260, 262, 264 of the relays 266, 268, 270, 272, 274 respectively, and thence through the emergency stop push button switch 128 to line L–1. It will be remembered that when the tong dogs are retracted, by closure of the tong dog push button switch 152, relay 266 is energized and the normally open switch 256 is closed. Thus, as the knees progress forwardly, the safety switches are opened successively, until the forward limit safety switch 136 is finally opened by its associated cam 214, to break the circuit of the forward relay 120 and de-energize the set shaft motor 50.

Under the conditions illustrated in FIGURE 3, the tong dogs are extended by opening the push button switch 152. The relay 266 thus is de-energized and hence the forward movement of the knees will be arrested when the tong dog safety switch 146 is opened by associated cam 216. Since this occurs earlier than the condition for FIGURE 2, the forward movement of the knees will be arrested before the extended tong dogs reach the saw line 26.

The taper condition illustrated in FIGURE 4 is achieved by closing the taper push button switch 174 to energize the solenoid 180 as well as the relay 184. Upon energization of the relay 184, closure of the normally open switch 188 completes a circuit from the line L–1 through relay 268 to line L–2. This relay causes its associated switch 258 to open, and thus the forward movement of the knees will be arrested when the taper safety switch is opened by its associated cam 276.

Under the condition illustrated in FIGURE 5, with the knees tapered and the tong dogs extended, the circuit of relay 270 is completed from line L–2 through the closed switch 278 of relay 266 and the closed switch 280 of the energized relay 268, through the emergency stop push button switch 128 to line L–1. Accordingly, the switch 260 associated with relay 270 is opened and forward movement of the knees is arrested when the taper and tong dog safety switch 252 is opened by its associated cam 282.

Under the condition illustrated in FIGURE 6, extension of the hook dog is achieved by energizing the air control valve solenoid 166, as described hereinbefore. This simultaneously energizes relay 170 and closes its associated switch 172 to complete the electric circuit of relay 272. Upon energization of this relay, the normally closed switch 262 associated therewith is opened, and hence forward movement of the knees is arrested when the hook safety switch 134 is opened by its associated cam 212.

Under the operating condition illustrated in FIGURE 7, wherein the knees are tapered and the hook dog is extended, energization of relays 268 and 272 closes the normally opened switches 280 and 284 associated therewith and thus completes the electric circuit of relay 274 from line L–2 through said closed switches, through the emergency stop push button 128 to line L–1. With the energization of the relay 274 the switch 264 associated therewith is opened and hence forward movement of the knees is arrested when the taper and hook dog safety switch 254 is opened by its associated cam 286.

As in the modification previously described, means also is provided in the embodiment of FIGURE 14 to prevent the hook dog from being extended and the knees from being tapered when the knee is positioned too close to the saw line. Thus, the source of electric potential for the hook dog actuating relay 158 extends from line L–2 through said relay 158, through the hook dog push button switch 154, through the normally closed switch 288 of relay 290, and thence through the hook feed safety switch 156 associated with the cam 218 to line L–1. In the event the knees have been tapered, energization of relay 184 closes the normally open switch 188 and completes the electric circuit of relay 290. Thus, the electric circuit through the hook feed safety switch is broken and the electric circuit for the hook actuator relay then must come from line L–1 through the taper and hook feed safety switch 292 and the closed position in normally open switch 294.

The electric potential for the taper solenoid 180 is supplied from the line L–1 through the taper feed safety switch 176, the normally closed switch 296 of relay 298, through the taper release push button 178 and the closed taper push button switch 174. However, in the event the hook dog has been extended prior to tapering of the knees, the energization of relay 170 and the closing of its associated switch contact 172, causes energization of relay 298. This opens the normally closed switch 296 and closes the normally open switch 300. Hence, electrical potential for the taper solenoid then must pass from line L–1 through the taper and hook feed safety switch 292 and thence through the closed switch 300. Thus, if it is desired to extend the hook dog when the knees are tapered, or if it is desired to taper the knees while the hook dog is extended, the electric supply for either of these must come through the taper and hook dog feed safety switch 292 which is controlled by the associated cam 302.

In order to maintain a taper, by keeping relay 184 energized, while retracting the hook dog from its extended position, relay 290 is provided with a third switch 304 which, when closed, by-passes to line L–1 the switches 296 and 300 of relay 298. Thus, relay 184 is maintained energized through switch 304 during reversion of the switches 296 and 300 when relay 298 is de-energized upon opening of the hook push button switch 154.

It is believed to be apparent from the foregoing description that the present invention effectively and economically provides for complete safety of operation of the components of a sawmill carriage, by preventing under any circumstances the projection of any of said components into the saw line. The safety system is readily adaptable to all types of carriages and does not interfere with nor modify the operational procedure of the carriage assembly.

It will be apparent to those skilled in the art that various changes in the details of construction described and illustrated herein may be made without departing from the scope and spirit of this invention. For example, it will be understood that the safety system relating to the hook dog may be duplicated for additional dogs, or may be modified to operate in conjunction with a plurality of hook dogs. Although the taper system described hereinbefore provides but a single taper control push button switch and associated elements to provide a single magnitude of taper, it will be understood that the multiple controls normally provided on a sawmill carriage for tapering the knees to various magnitudes and directions, may be associated with the safety system of this invention, either through a single taper safety assembly or through multiple taper safety assemblies, each related to a given magnitude of taper.

Further, as explained hereinbefore, the prime mover for the knees may be of the rectilinear type such as hydraulic rams, instead of the rotary type employed with the rotary set shaft illustrated. In such event, it will be understood that the rotary cam and shaft arrangement illustrated may be replaced by a cam system which is operable by rectilinear motion. Still further, the function of the safety switches and associated cams may be provided by other means, such as electrical potential matching systems which function, upon achieving a potential match at a predetermined point of forward movement of the knees, to open the electric circuit of the forward relay 120.

The safety system of this invention is adaptable for use with apparatus other than sawmill carriages. Thus, the reciprocable knee structure 52 accommodating taper, and the reciprocable tong and hook dogs, may have their counterparts in other apparatus wherein reciprocable members are movable selectively with respect to a reference point.

The foregoing and other changes may be made, and therefore it is to be understood that the foregoing description is primarily illustrative of the invention and does not define the scope of the appended claims.

Having now described my invention and the manner in which the same may be used, what I claim as new and desire to secure by Letters Patent is:

1. For use with apparatus having a support assembly reciprocable relative to a reference point, and electrically actuated first drive means therefor, the support assembly including a plurality of reciprocable members, and electrically actuated drive means for reciprocating each member *between extended and retracted positions* relative to the reference point independently of the first drive means: safety means for preventing extension across the reference point of said reciprocable members, said safety means comprising switch means in the circuit of the first drive means actuator, and switch actuator means operatively associated with the said reciprocable members of the support assembly and operable by the first drive means for actuating the switch means [when the forwardmost one of the said reciprocable members reaches a predetermined position relative to the reference point, whereby to stop the movement of the support assembly toward the reference point] *and stopping the movement of the support assembly toward the reference point when at least one of the reciprocable members is in extended position and the forwardmost one of said extended members reaches a predetermined position short of the reference point.*

2. The safety means of claim 1 including switch means in each of the circuits of the actuators for the reciprocable members, and switch actuator means operatively associated with each of the corresponding reciprocable members of the support assembly and operable by the first drive means for actuating the switch means *and deactivating the associated reciprocable member actuator* when the support assembly is so positioned relative to the reference point that *subsequent* extension of the *retracted* reciprocable members would bring said members across the reference point.

3. For use with apparatus having a support assembly reciprocable relative to a reference point, and electrically actuated first drive means therefor, the support assembly including a plurality of reciprocable members, and electrically actuated drive means for reciprocating each member *between extended and retracted positions* relative to the reference point independently of the first drive means: safety means for preventing extension across the reference point of said reciprocable members, said safety means comprising a plurality of switch means in the circuit of the first drive means actuator and each operatively associated with one of said reciprocable members, and a plurality of switch actuator means each operatively associated with one of the said reciprocable members of the support assembly and operable by the first drive means for actuating the switch means [associated with the forwardmost one of the said reciprocable members when the latter reaches a predetermined position relative to the reference point, whereby to stop the movement of the support assembly toward the reference point] *and stopping the movement of the support assembly toward the reference point when at least one of the reciprocable members is in extended position and the forwardmost one of said extended members reaches a predetermined position short of the reference point.*

4. For use with a sawmill carriage having a knee assembly reciprocal relative to a saw line, and electrically actuated first drive means therefor, the knee assembly including a plurality of reciprocable log-engaging members, and electrically actuated drive means for reciprocating each log-engaging member *between extended and retracted positions* relative to the saw line independently of the first drive means: safety means for preventing extension across the saw line of said reciprocable log-engaging members, said safety means comprising switch means in the circuit of the first drive means actuator, and switch actuator means operatively associated with the said reciprocable log-engaging members of the knee assembly and operable by the first drive means for actuating the switch means [when the forwardmost one of the said reciprocable log-engaging members reaches a predetermined position relative to the saw line, whereby to stop the movement of the knee assembly toward the saw line] *and stopping the movement of the knee assembly toward the saw line when at least one of the reciprocable members is in extended position and the forwardmost one of said extended members reaches a predetermined position short of the saw line.*

5. The safety means of claim 4 including switch means in each of the circuits of the actuators for the reciprocable members, and switch actuator means operatively associated with each of the corresponding reciprocable members of the knee assembly and operable by the first drive means for actuating the switch means *and deactivating the associated reciprocable member actuator* when the knee assembly is so positioned relative to the saw line that *subsequent* extension of the *retracted* reciprocable members would bring said members across the saw line.

6. For use with a sawmill carriage having a knee assembly reciprocable relative to a saw line, and electrically actuated first drive means therefor, the knee assembly including a plurality of reciprocable log-engaging members, and electrically actuated drive means for reciprocating each log-engaging member *between extended and retracted positions* relative to the saw line independently of the first drive means; safety means for preventing extension across the saw line of said reciprocable log-engaging members, said safety means comprising a plurality of switch means in the circuit of the first drive means actuator and each operatively associated with one of said reciprocable log-engaging members, and a plurality of switch actuator means each operatively associated with one of the said reciprocable log-engaging members of the knee assembly and operable by the first drive means for actuating the switch means [associated with the forwardmost one of the said reciprocable log-engaging members when the latter reaches a predetermined position relative to the saw line, whereby to stop the movement of the knee assembly toward the saw line] *and stopping the movement of the knee assembly toward the saw line when at least one of the reciprocable members is in extended position and the forwardmost one of said extended members reaches a predetermined position short of the saw line.*

7. For use with a sawmill carriage having a knee assembly reciprocable relative to a saw line, and electrically actuated first drive means therefor, the knee assembly including a plurality of reciprocable log-engaging members, and electrically actuated drive means for reciprocating each log-engaging member *between extended and retracted positions* relative to the saw line independenlty of the first drive means: safety means for preventing extension across the saw line of said reciprocable log-engaging members, said safety means comprising switch means in the circuit of the first drive means actuator, switch actuator means, and means operable by the first drive means for moving the switch means and switch actuator means relative to each other, the switch actuator means functioning upon engagement with the switch means [associated with the forwardmost one of the said reciprocable log-engaging members when the latter reaches a predetermined position relative to the saw line, to actuate the switch means whereby to stop the movement of the knee assembly toward the saw line] *to stop the movement of the knee assembly toward the saw line when at least one of the reciprocable members is in extended position and the forwardmost one of said extended members reaches a predetermined position short of the saw line.*

8. For use with a sawmill carriage having a knee assembly reciprocable relative to a saw line, and electrically actuated first drive means therefor, the knee assembly including a reciprocable log-engaging member, electrically actuated second drive means for reciprocating the log-engaging member *between extended and retracted positions* relative to the saw line independently of the first drive means for tapering said log-engaging member, a reciprocable dog member on the log-engaging member, and electrically actuated third drive means for reciprocating the dog member relative to the saw line: safety means for preventing extension across the saw line of said reciprocable log-engaging member and dog member, said safety means comprising switch means in the circuit of the first drive means actuator, and switch actuator means operatively associated with the said reciprocable members of the support assembly and operable by the first drive means for actuating the switch means [when the forwardmost one of the said reciprocable members reaches a predetermined position relative to the saw line, whereby to stop the movement of the knee assembly toward the saw line] *and stopping the movement of the knee assembly toward the saw line when at least one of the reciprocable members is in extended position and the forwardmost one of said extended members reaches a predetermined position short of the saw line.*

9. For use with a sawmill carriage having a knee assembly reciprocable to a saw line, and electrically actuated first drive means therefor, the knee assembly including a reciprocable log-engaging member, electrically actuated second drive means for reciprocating the log-engaging member *between extended and retracted positions* relative to the saw line independently of the first drive means for tapering said log-engaging member, reciprocable dog members on the log-engaging member, and electrically actuated drive means for reciprocating each dog member independently relative to the saw line: safety means for preventing extension across the saw line of said reciprocable log-engaging member and dog members, said safety means comprising a plurality of switch means in the circuit of the first drive means actuator and each operatively associated with one of said reciprocable members, and a plurality of switch actuator means each operatively associated with one of the said reciprocable members of the knee assembly and operable by the first drive means for actuating the switch means [associated with the forwardmost one of the said reciprocable members when the latter reaches a predetermined position relative to the saw line, whereby to stop the movement of the knee assembly toward the saw line] *and stopping the movement of the knee assembly toward the saw line when at least one of the reciprocable members is in extended position and the forwardmost one of said extended members reaches a predetermined position short of the saw line.*

10. The safety means of claim 9 including switch means in each of the circuits of the reciprocable taper and dog drive means actuators, and switch actuator means operatively associated with each of the corresponding reciprocable members of the knee assembly and operable by the first drive means for actuating the switch means *and deactivating the associated reciprocable member actuator* when the knee assembly is so positioned relative to the saw line that *subsequent forward* tapering of the log-engaging member and extension of the *retracted* dog members would bring said members across the saw line.

*11. For use with apparatus having a support assembly reciprocable relative to a reference point, and electrically actuated first drive means therefor, the support assembly including a reciprocable member, and electrically actuated drive means for reciprocating said member between extended and retracted positions relative to the reference point independently of the first drive means: safety means for preventing extension across the reference point of said reciprocable member, said safety means comprising switch means in the circuit of the first drive means actuator, and switch actuator means operatively associated with the said reciprocable member of the support assembly and operable by the first drive means for actuating the switch means and stopping the movement of the support assembly toward the reference point when the reciprocable member is in extended position and reaches a predetermined position short of the reference point.*

*12. The safety means of claim 11 including switch means in the circuit of the actuator for the reciprocable member, and switch actuator means operatively associated with the reciprocable member of the support assembly and operable by the first drive means for actuating the switch means and deactivating the reciprocable member actuator when the support assembly is so positioned relative to the reference point that subsequent extension of the retracted reciprocable member would bring said member across the reference point.*

*13. For use with a sawmill carriage having a knee assembly reciprocable relative to a saw line, and electrically actuated first drive means therefor, the knee assembly including a reciprocable log-engaging member, and electrically actuated drive means for reciprocating the log-engaging member between extended and retracted positions relative to the saw line independently of the first drive means: safety means for preventing extension across the saw line of said reciprocable log-engaging member, said safety means comprising switch means in the circuit of the first drive means actuator, and switch actuator means operatively associated with the said reciprocable log-engaging member of the knee assembly and operable by the first drive means for actuating the switch means and stopping the movement of the knee assembly toward the saw line when the reciprocable member is in extended position and reaches a predetermined position short of the saw line.*

*14. The safety means of claim 13 including switch means in the circuit of the actuator for the reciprocable log-engaging member, and switch actuator means operatively associated with the reciprocable log-engaging member and operable by the first drive means for actuating the switch means and deactivating the reciprocable member actuator when the knee assembly is so positioned relative to the saw line that subsequent extension of the retracted reciprocable log-engaging member would bring said member across the saw line.*

References Cited in the file of this patent or the original patent

UNITED STATES PATENTS

| | | |
|---|---|---|
| 1,725,861 | Grueter | Aug. 27, 1929 |
| 1,846,621 | Tanner | Feb. 23, 1932 |
| 2,466,776 | May | Apr. 12, 1949 |
| 2,661,779 | Saunders | Dec. 8, 1953 |
| 2,721,588 | Roberts | Oct. 25, 1955 |
| 2,807,293 | Smith et al. | Sept. 24, 1957 |